United States Patent [19]

Orton

[11] Patent Number: 4,832,389
[45] Date of Patent: May 23, 1989

[54] DEVICE FOR LIFTING A DUTCH OVEN OR ITS LID

[76] Inventor: Cornell C. Orton, 612 N. 100W., Parowan, Utah 84761

[21] Appl. No.: 224,348

[22] Filed: Jul. 26, 1988

[51] Int. Cl.$^4$ ............................................. A47J 49/00
[52] U.S. Cl. ....................................... 294/13; 294/12
[58] Field of Search ................... 294/12, 13, 9, 10, 11, 294/14, 6, 15, 19.1, 24

[56] References Cited

U.S. PATENT DOCUMENTS

| | | | |
|---|---|---|---|
| 626,023 | 5/1899 | Hoage et al. | 294/12 |
| 1,004,312 | 9/1911 | Totty | 294/10 |
| 1,193,950 | 8/1916 | Vezina | 294/14 |
| 4,222,599 | 9/1980 | Gale et al. | 294/12 |
| 4,491,357 | 1/1985 | Richards | 294/9 |
| 4,494,786 | 1/1985 | Paulus et al. | 294/9 |

Primary Examiner—James B. Marbert
Attorney, Agent, or Firm—Norman B. Rainer

[57] ABSTRACT

A device is provided for lifting the bail handle or lid of a dutch oven. When the lid is lifted, the device can be placed upon the ground while maintaining the lid out of contact with the ground. The device is comprised of a handle member pivotably connected to a base member having a trapezoidal shape. The base can be moved about the pivotable connection between a functional state disposed perpendicularly to the handle member, and a storage state disposed in line with the handle member.

9 Claims, 3 Drawing Sheets

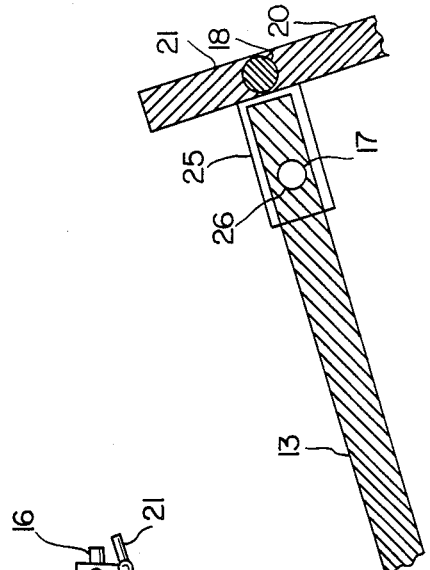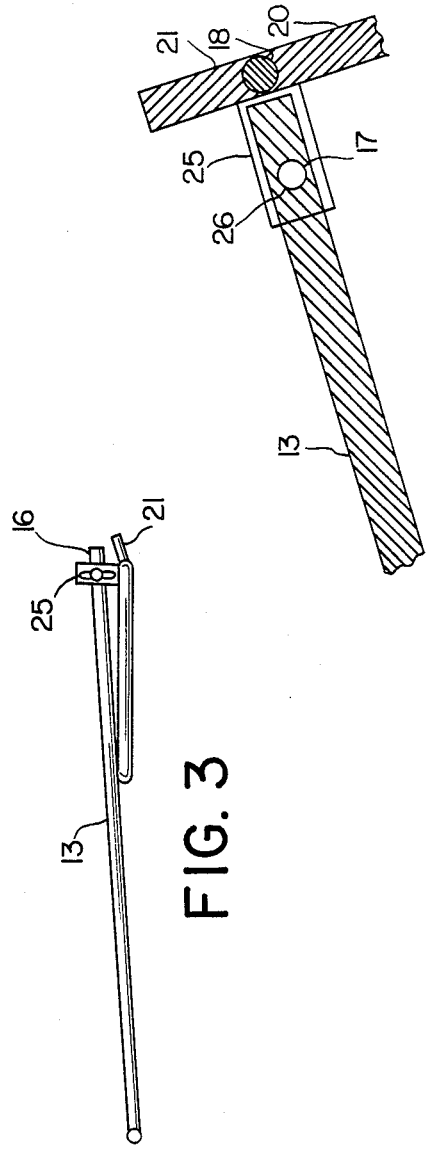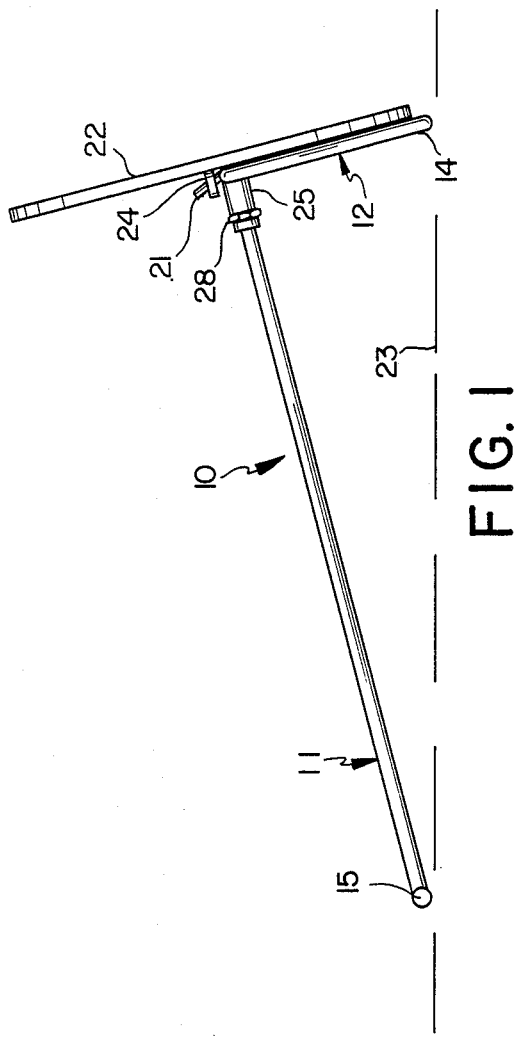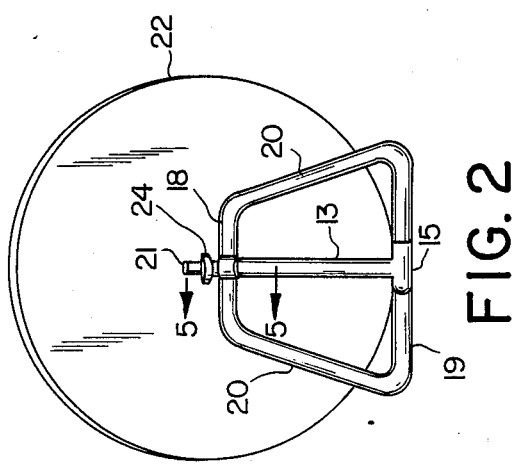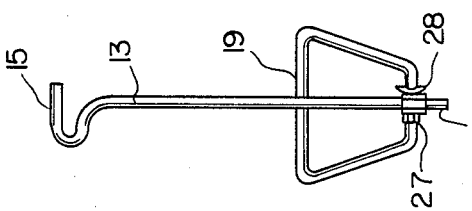

DEVICE FOR LIFTING A DUTCH OVEN OR ITS LID

BACKGROUND OF THE INVENTION

Dutch ovens have been in use for many years, being especially suited for outdoor cooking and for preparing meals at campsites. Normally these ovens are quite heavy, often made of cast iron. The ovens include a lid upon which coals may be placed to assist in heating the oven, while the oven kettle or container itself rests upon a bed of coals, over a fire, heated stones, or other heat source. Because of their heavy weight, dutch ovens, especially when containing ingredients, are difficult to lift for removal from the heat source, even though a bail handle is provided for lifting.

To inspect the cooking ingredients, or remove them for serving, the lid must be lifted from the vessel. An eye or equivalent structure is affixed to the center of the upper surface of the lid to facilitate its lifting. However, the lifting of the lid is difficult because the person doing the lifting must lean awkwardly over the heat source and carefully handle the heavy, hot lid so as to avoid an accidental burn.

A tool has been disclosed in U.S. Pat. No. 4,222,599 to Gale et al for the lifting of either the vessel by engagement with the bail handle, or lifting of just the lid by engagement with the lifting eye. Although useful, the Gale tool is of large size, requiring considerable storage space, and further makes no provision for setting down the removed lid in a manner to avoid contamination of the lower surface of the lid and to re-lift the lid for returning it to the vessel.

It is accordingly an object of the present invention to provide a device for lifting a dutch oven or its lid.

It is another object of this invention to provide a device as in the foregoing object capable of disposing the removed lid in a manner to avoid contamination of the lower surface and facilitate its return to the vessel.

It is a further object of the present invention to provide a device of the aforesaid nature which is collapsible to a small size for storage.

It is yet another object of this invention to provide a device of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a lifting and holding device comprising:

(a) a handle member comprised of a straight center portion, an upper extremity having a straight gripping portion disposed perpendicularly to the center portion and centered thereupon, and a lower extremity penetrated by first channel means disposed in a direction parallel to said gripping portion, (b) a base member comprised of a rod bent to an isosceles trapezoid shape having short and long parallel sides and opposed angled sides, the length of said angled sides being equal to the length of said long parallel side, (c) a stub rod perpendicularly affixed to the short side at the midpoint thereof and directed away from the base member and substantially centered upon the plane of the trapezoid, and (d) connecting hinge means comprising a retaning member attached to said short side at the midpoint thereof in substantially perpendicular disposition to the plane of the trapezoid, said retaining member having second channel means aligned with said first channel means, a pivot bolt which passes through said first and second channel means, and threaded tightening means interactive with said pivot bolt for adjustably securing said handle member with respect to said base member, whereby (e) said handle member may be deployed to a position vertically disposed to said base member, representing the functional state of the device, and may alternatively be deployed to a position in abutment with said long side, representing the storage state of the device.

In certain embodiments, the handle member may be fashioned from a single piece of iron rod stock of about ½" diameter, the gripping portion being formed by the bending of the uppermost extremity of the rod stock. The base member may be fashioned from a single piece of iron rod stock of about ⅜" diameter, the ends of which are welded together at the midpoint of said short side. The retaining member and stub rod may be attached to the base member by welding.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the device of the present invention shown in its deployed state and holding the lid of a dutch oven.

FIG. 2 is an end view of the device of FIG. 1.

FIG. 3 is a side view of the device of FIG. 1 in its folded, storage state.

FIG. 4 is a top view of the folded device of FIG. 3.

FIG. 5 is an enlarged fragmentary sectional view taken upon the line 5—5 of FIG. 2.

DESCRIPTION OF THE PREFERRED EMBODIMENT

Figure 6:
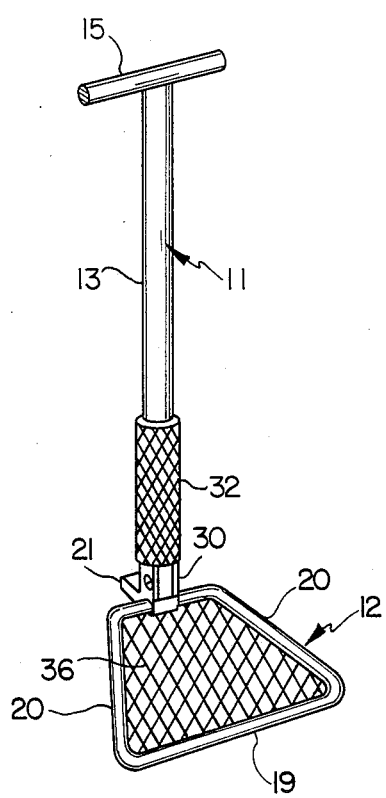
FIG. 6 is a perspective front view of an alternative embodiment of the device of this invention.

Referring to FIGS. 1-5, an embodiment of the device 10 of this invention is shown comprised of handle member 11 pivotably attached to base member 12. A lid 22 of a dutch oven is shown supported by the device above the ground 23.

Handle member 11, fabricated of a single piece of metal rod stock, is a staff having an elongated straight center portion 13, an upper extremity 14 bent so as to have a straight gripping portion 15 disposed perpendicularly to the center portion and centered thereupon, and a lower extremity 16 penetrated by first channel 17 directed parallel to gripping portion 15.

Base member 12 is comprised of a single metal rod bent to an isoscles trapezoid shape having short and long parallel sides, 18 and 19, respectively centered upon a common axis, and angled sides 20. The shape is such that the length of long side 19 is equal to the lengths of angled sides 20. The ends of the rod are welded together at the midpoint of short side 18. A stub rod 21 is welded to the midpoint of short side 18 in a manner to dispose rod 21 perpendicularly to side 18 but directed away from the base member at an angle of about 5 degrees with respect to the plane of the trapezoid. The stub rod is adapted to engage either the bail of the kettle or the eye 24 in lid 22. Once the lid is engaged by stub rod 21, its upper surface comes to rest upon base 12 when the device is placed so that gripping portion 15 and long side 19 are resting upon the ground.

A retaining member in the form of post 25 is welded to short side 18 at the midpoint thereof in perpendicular disposition to the plane of the trapezoid and on the same side of said plane as the stub rod. The retaining post, which may be a short piece of channel iron, has a second channel 26 aligned with first channel 17 of said handle member. A threaded pivot bolt 27 passes through aligned channels 17 and 26. A wing nut 28 or equivalent tightening means engages the bolt to provide adjustable securement of the handle member with respect to retaining post 25.

When the handle member is secured in a perpendicular disposition with respect to the base member, the device may be used to lift either the lid or the bail of the kettle. By loosening wing nut 28, the handle member can be folded down upon the base member, as shown in FIGS. 3 and 4, representing a compact storage state of the device.

Figure 7:
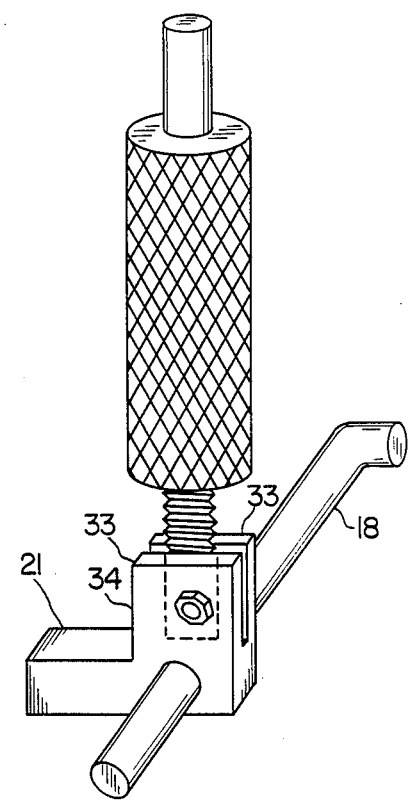
FIG. 7 is an enlarged fragmentary perspective view of the device of FIG. 6.
Figure 8:
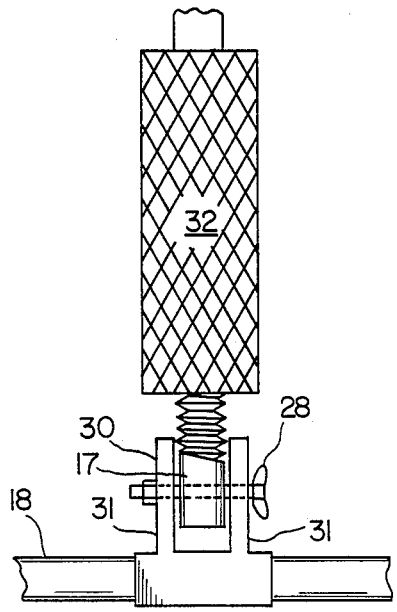
FIG. 8 is a fragmentary front view of the device of FIG. 6.
Figure 9:
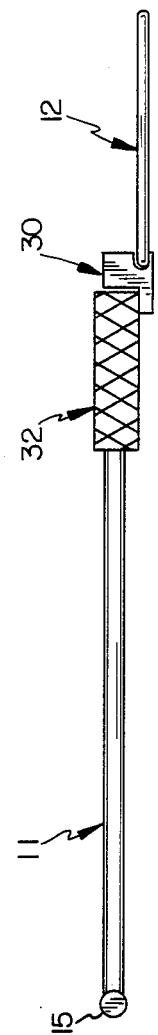
FIG. 9 is a side view of the embodiment of FIG. 6 in its folded, storage state.

In the alternative embodiment shown in FIGS. 6, 7 and 8, retaining member 30 is a bifurcated yoke structure having second channels 31 that align with first channel 17 in the handle member. Gripping portion 15 of said alternative embodiment is fashioned as a length of rod stock attached to the uppermost extremity of center portion 13. A knurled holding collar 32 having a diameter larger than center portion 13 is threadably associated with the lowermost extremity of center portion 13. Said holding collar is adapted to engage upper abutment shoulders 33 of retaining member 30 to secure the handle member in the deployed state of the device, and engage side abutment shoulders 34 of said retaining member to secure the handle member in the storage state of the device. Stub rod 21 of said alternative embodiment of the device is fashioned as a continuous integral extension of retaining member 30. An iron gridwork 36 is welded within base member 12 of said alternative embodiment. The gridwork is useful for scooping coals out of the fire.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A lifting and holding device comprising:
    (a) a handle member comprised of a straight center portion, an upper extremity having a straight gripping portion disposed perpendicularly to the center portion and centered thereupon, and a lower extremity penetrated by first channel means disposed in a direction parallel to said gripping portion,
    (b) a base member having an isosceles trapezoid shape having short and long parallel sides and opposed angled sides, the length of said angled sides being equal to the length of said long parallel side,
    (c) stub means perpendicularly affixed to the short side at the midpoint thereof and directed away from the base member and substantially centered upon the plane of the trapezoid, and
    (d) connecting hinge means comprising a retaining member attached to said short side at the midpoint thereof in substantially perpendicular disposition to the plane of the trapezoid, said retaining member having second channel means aligned with said first channel means, a pivot bolt which passes through said first and second channel means, and threaded tightening means interactive with said pivot bolt for adjustably securing said handle member with respect to said base member, whereby
    (e) said handle member may be deployed to a position vertically disposed to said base member, representing the functional state of the device, and may alternatively be deployed to a position substantially coextensive with the plane of the trapezoid, representing the storage state of the device.

2. The device of claim 1 wherein said base member is comprised of bent iron rod.

3. The device of claim 1 wherein said handle member is fashioned from a single piece of iron rod stock having an uppermost extremity which is bent to form said gripping portion.

4. The device of claim 1 wherein the lower extremity of said handle member threadably retains a knurled holding collar.

5. The device of claim 1 wherein said retaining member and stub means are attached by welding to the short parallel side of the base.

6. The device of claim 4 wherein said retaining means has a bifurcated yoke structure for adjustably securing said handle member, and additionally has upper and side abutment shoulders.

7. The device of claim 6 wherein said stub means is integral with said retaining means.

8. The device of claim 6 wherein said holding collar is adapted to engage said upper abutment shoulders to secure the handle member in its functional state, and engage said side abutment shoulders to secure the handle member in its storage state.

9. The device of claim 1 wherein said base member has an iron gridwork.

* * * * *